US011193902B2

(12) United States Patent
Miao et al.

(10) Patent No.: US 11,193,902 B2
(45) Date of Patent: Dec. 7, 2021

(54) METHOD AND DEVICE FOR MEASURING TRANSVERSE THERMAL CONDUCTIVITY OF THIN FILM

(71) Applicant: WUHAN JOULE YACHT SCIENCE & TECHNOLOGY CO., LTD., Hubei (CN)

(72) Inventors: Xiangshui Miao, Hubei (CN); Hao Tong, Hubei (CN); Kaizhan Wang, Hubei (CN); Yuanbing Wang, Hubei (CN); Lingjun Zhou, Hubei (CN); Yingrui Cai, Hubei (CN)

(73) Assignee: WUHAN JOULE YACHT SCIENCE & TECHNOLOGY CO., LTD., Hubei (CN)

( * ) Notice: Subject to any disclaimer, the term of this patent is extended or adjusted under 35 U.S.C. 154(b) by 94 days.

(21) Appl. No.: 16/644,160

(22) PCT Filed: Sep. 15, 2017

(86) PCT No.: PCT/CN2017/101921
§ 371 (c)(1),
(2) Date: Mar. 3, 2020

(87) PCT Pub. No.: WO2019/051793
PCT Pub. Date: Mar. 21, 2019

(65) Prior Publication Data
US 2021/0109047 A1    Apr. 15, 2021

(51) Int. Cl.
*G01N 25/18* (2006.01)
*G01K 13/00* (2021.01)
(Continued)

(52) U.S. Cl.
CPC ............. *G01N 25/20* (2013.01); *G01N 25/02* (2013.01)

(58) Field of Classification Search
USPC .................................. 374/44, 163, 102, 173
See application file for complete search history.

(56) References Cited

U.S. PATENT DOCUMENTS

2013/0266038 A1    10/2013    Shih et al.

FOREIGN PATENT DOCUMENTS

| CN | 101975794 | 2/2011 |
| CN | 102279204 | 12/2011 |

(Continued)

OTHER PUBLICATIONS

"International Search Report (Form PCT/ISA/210) of PCT/CN2017/101921," dated Jun. 22, 2018, with English translation thereof, pp. 1-5.

*Primary Examiner* — Mirellys Jagan
(74) *Attorney, Agent, or Firm* — JCIP Global Inc.

(57) ABSTRACT

The disclosure provides a method for measuring the transverse thermal conductivity of a thin film. The method comprises the steps of measuring the longitudinal thermal conductivity of a thin film to be measured by using a 3ω method and by taking a second metal strip deposited on the surface of the thin film to be measured as a heating source at first; measuring the temperature rise of the thin film to be measured in the longitudinal direction by using the 3ω method, and deducing the thermal power of the thin film to be measured in the longitudinal direction; and finally, calculating the transverse thermal conductivity of the thin film to be measured. By adopting a 'substrate/thin film to be measured/metal strip' sample structure, the process difficulty of preparing a suspension structure sample can be effectively avoided.

12 Claims, 6 Drawing Sheets

(51) Int. Cl.
*G01K 7/16* (2006.01)
*G01N 25/20* (2006.01)
*G01N 25/02* (2006.01)

(56) References Cited

FOREIGN PATENT DOCUMENTS

| | | |
|---|---|---|
| CN | 103091354 | 5/2013 |
| CN | 103698357 | 4/2014 |
| CN | 104034752 | 9/2014 |
| CN | 104677936 | 6/2015 |
| JP | 2004234755 | 8/2004 |

METHOD AND DEVICE FOR MEASURING TRANSVERSE THERMAL CONDUCTIVITY OF THIN FILM

CROSS-REFERENCE TO RELATED APPLICATION

This application is a 371 of international application of PCT application serial no. PCT/CN2017/101921, filed on Sept. 15, 2017. The entirety of the above mentioned patent application is hereby incorporated by reference herein and made a part of this specification.

TECHNICAL FIELD

The present disclosure belongs to the technical field of thermophysical property testing on thin film materials, and particularly relates to a method and device for measuring the transverse thermal conductivity of a thin film.

BACKGROUND

Thermal conductivity is one of the important parameters to characterize the thermophysical properties of a thin film material. The magnitude of the thermal conductivity of the thin film material determines the ability of a thin film to conduct or insulate heat. For example, with the development of microelectronic devices towards higher integration level, if the heat dissipation performance of the microelectronic devices is not good, the local high temperature of device units will be caused, so that the service lives of the devices can be shortened and even the devices can be damaged, and the higher the thermal conductivity is, the stronger the heat conduction capacity is, the better the heat dissipation capacity is; and in addition, a heat insulation material can also be applied to the fields of buildings, oceans, aerospace and the like, for example, the heat insulation material can isolate the influence of hot summer on an indoor environment as much as possible, so that the indoor environment can maintain cool. Therefore, it is necessary to study the thermal conductivity, and the anisotropy of the thin film leads to a great difference in the thermal conductivity of the thin film in all directions, for example, the longitudinal thermal conductivity of a superlattice phase change material in a phase change memory is smaller than the transverse thermal conductivity due to the influence of the interface thermal resistance, and if the thermal conductivities of the superlattice thin film can be accurately measured, it is of great significance for the development of the phase change memory. Therefore, it is of great practical significance to study a method and device for measuring the transverse thermal conductivity of thin films.

Existing common methods for measuring the transverse thermal conductivity of the thin films are divided into a steady-state measurement method and a transient measurement method.

The steady-state measurement method includes a suspension film method, a micro-bridge method and a steady-state double-bridge method, the success rate of samples is extremely low because the prepared samples need suspension structures in the three methods, and great difficulty is brought to the measurement of the transverse thermal conductivity. In addition, in the suspension film method, the transverse heat transfer distance of the thin film is assumed to be a distance from the edge of a metal strip to a heat sink, but in the actual measurement process, if the thermal conductivity of the thin film to be measured is quite low, the actual transverse heat transfer distance is quite short, and at the moment, the method is not applicable; and sensors used in the micro-bridge method are thermistors or thermocouples, and tiny temperature rise cannot be accurately measured.

The transient measurement method comprises a laser flash method and a 3ω method. The laser flash method requires precise optical circuits because the laser flash method requires laser heating and testing and involves extraction of laser signals, for multilayer thin films and thin films with large thicknesses, it is limited by laser transmittance and cannot be accurately measured, and in addition, the laser flash method cannot directly test a transparent material. In the 3ω method, radiation errors can be effectively reduced by reducing heat exchange area because the sizes of samples are small, the test time is shorter compared with that of the steady measurement method, and the test speed is increased, so that the 3ω method is an important method for measuring the thermal conductivity of the thin film. Some methods for measuring the transverse thermal conductivity of thin films also exist at present, but the methods are not suitable for thin films with nanoscale thicknesses. The transverse heat transfer distance of the thin films cannot be accurately determined by measuring a suspension film structure sample by the 3ω method.

SUMMARY

The technical problem to be solved by the present disclosure is to provide a method and device for measuring the transverse thermal conductivity of a thin film, and the transverse thermal conductivity of a micro-nano thin film can be conveniently and accurately measured.

The technical solution adopted by the present disclosure for solving the technical problem is as follows: the method for measuring the transverse thermal conductivity of the thin film comprises the following steps:

S1, measuring the longitudinal thermal conductivity $K_Y$ of a thin film to be measured by using a 3ω method and by taking a second metal strip as a heating source; depositing the second metal strip on the surface of the thin film to be measured, arranging a substrate on the bottom of the thin film to be measured, forming a sample by the thin film to be measured and the substrate, and arranging the sample in a non-suspension mode; and setting the longitudinal direction as a direction perpendicular to the thin film to be measured;

S2, measuring the temperature rise of the thin film to be measured in the longitudinal direction by using the 3ω method and by taking a first metal strip as a heating source, and deducing the thermal power $P_Y$ of the thin film to be measured in the longitudinal direction in combination with the measured longitudinal thermal conductivity $K_Y$; meanwhile, measuring the temperature rise $\Delta T_1$ of the first metal strip, and the temperature rise $\Delta T_2$ of the second metal strip caused by a thermal field generated by the temperature rise of the first metal strip in the transverse direction of the thin film to be measured;

calculating the total power P of the first metal strip through the current and the resistance of the first metal strip; and calculating the thermal power $P_1$ consumed by the first metal strip due to resistance change through the change amounts of the current and the resistance of the first metal strip;

depositing the first metal strip on the surface of the sample, enabling the first metal strip and the second metal strip to be parallel to each other, the distance to be D and the lengths L to be equal, enabling the line width of the second metal strip to be larger than that of the first metal strip; and setting the transverse direction to be a direction in which the surface of the thin film to be measured is perpendicular to the length direction of the first metal strip; and S3, calculating the transverse thermal conductivity $K_X$ of the thin film to be measured with the thickness of d according to the following formula:

$$K_X = \frac{(P - P_1 - P_Y)D}{2Ld(\Delta T_1 - \Delta T_2)}.$$

According to the method, the first metal strip and the second metal strip are made of Ag, Au or Pt.

According to the method, the line width $b_1$ of the first metal strip is 2-15 μm, and the line width $b_2$ of the second metal strip is 30-100 μm.

According to the method, the distance D is determined according to the estimated value of the transverse thermal conductivity of the thin film to be measured, the length of the metal strips and the thickness of the thin film to be measured; and the estimated value of the transverse thermal conductivity of the thin film to be measured is of an order of magnitude, analyzed according to literature or other data, of the transverse thermal conductivity of the thin film to be measured.

According to the above method, when the length of the first metal strip is 3.2 mm, and the thickness of the thin film to be measured is 1 μm, then, if the estimated value of the transverse thermal conductivity of the thin film to be measured is 10 W/(m*K), then the distance D is in the range of 3.2 μm-32 μm; if the estimated value of the transverse thermal conductivity of the thin film to be measured is 100 W/(m*K), then the distance D is in the range of 32-320 μm; and if the estimated value of the transverse thermal conductivity of the thin film to be measured is 500 W/(m*K), then the distance D is in the range of 160-1600 μm.

According to the method, the thin film to be measured is a conductive thin film, a layer of insulating thin film covers the conductive thin film, and the first metal strip and the second metal strip are deposited on the insulating thin film.

According to the method, the conductive thin film is a low-thermal-conductivity thin film to be measured with the nanoscale thickness, the insulating thin film is a known high-thermal-conductivity insulating thin film, and the order of magnitude of the total thickness of the thin film to be measured is tens of micrometers.

According to the method, after the transverse thermal conductivity $K_X$ of the thin film to be measured with the thickness of d is obtained, the transverse thermal conductivity of the low-thermal-conductivity thin film to be measured with the nanoscale thickness is calculated according to the following formula:

$$\lambda_{total}d_{total} = \lambda_1 d_1 + \lambda_2 d_2.$$

In the formula, $\lambda_{total}$, $\lambda_1$ and $\lambda_2$ are the thermal conductivities of the thin film to be measured, the conductive thin film and the insulating thin film respectively; and $d_{total}$, $d_1$ and $d_2$ are respectively the thicknesses of the thin film to be measured, the conductive thin film and the insulating thin film.

According to the method, the temperature rise $\Delta T_Y$ in the longitudinal direction of the thin film to be measured is obtained by subtracting the temperature rise $\Delta T_S$ of the substrate from the temperature rise $\Delta T$ of the metal strips.

The device for measuring the transverse thermal conductivity of the thin film comprises:

a first metal strip and a second metal strip which are deposited on the surface of the thin film to be measured, wherein the first metal strip and the second metal strip are parallel to each other, the distance is D, the lengths L are equal, and the line width of the second metal strip is larger than that of the first metal strip; pins for measurement by a 3ω method are respectively arranged on the first metal strip and the second metal strip; a substrate is arranged on the bottom of the thin film to be measured, and the thin film to be measured and the substrate form a sample;

an alternating current source, two differential amplifiers, an adjustable resistor, a phase-locked amplifier, a data processing controller, an source measurement unit (SMU) and a direct current regulated power supply which are used for measurement by the 3ω method, wherein the alternating current source is controlled by the data processing controller; the output end of the alternating current source, the input ends of the first differential amplifier and one end of the adjustable resistor are simultaneously only connected with the pin of the first metal strip or the pin of the second metal strip, and the other end of the adjustable resistor is grounded; the input ends of the second differential amplifier are connected with the two ends of the adjustable resistor in parallel; the output ends of the two differential amplifiers are connected with the input ends of the phase-locked amplifier, and the output end of the phase-locked amplifier is connected with the data processing controller; the SMU is connected with the pin of the second metal strip; and the direct current regulated power supply is used for providing driving voltages for the two differential amplifiers;

a vacuum device which is used for providing a vacuum environment for the thin film to be measured;

the data processing controller is used for calculating the transverse thermal conductivity $K_X$ of the thin film to be measured with the thickness of d according to the following formula:

$$K_X = \frac{(P - P_1 - P_Y)D}{2Ld(\Delta T_1 - \Delta T_2)}.$$

In the formula, P is the total power of the first metal strip; $P_1$ is the thermal power consumed by the first metal strip due to resistance change; $K_Y$ is the longitudinal thermal conductivity of the thin film to be measured, and is measured by taking the second metal strip as a heating source by using the 3ω method; $\Delta T_1$ is the temperature rise of the first metal strip, $\Delta T_2$ is the temperature rise of the second metal strip caused by a thermal field generated by the temperature rise of the first metal strip in the transverse direction of the thin film to be measured, and is measured by taking the first metal strip as a heating source by using the 3ω method; the longitudinal direction is a direction perpendicular to the thin film to be measured, and the transverse direction is a direction in which the surface of the thin film to be measured is perpendicular to the length direction of the first metal strip.

According to the device, the sample, the first metal strip, the second metal strip and the two differential amplifiers are arranged on a printed circuit board (PCB), and the PCB is placed in the vacuum device.

According to the device, the first metal strip is sequentially provided with four pins M1-1, M1-2, M1-3 and M1-4 in the length direction; and the second metal strip is sequentially provided with four pins M2-1, M2-2, M2-3 and M2-4 in the length direction.

The present disclosure has the beneficial effects that: by adopting a 'substrate/thin film to be measured/metal strip' sample structure, the process difficulty of preparing a suspension structure sample can be effectively avoided; by using the metal strips as temperature detectors, the problem of low accuracy caused by temperature sensors such as thermocouples or thermistors can be solved; the measurement object can be a micro-nano thin film; and the transverse temperature difference of the thin film can be accurately measured by using the two metal strips, and the accuracy of the measurement result is higher.

In the figure: 1—alternating current source, 2—PCB, 3—adjustable resistor, 4—SMU, 5—direct current regulated power supply, 6—first differential amplifier, 7—phase-locked amplifier, 8—computer, 9—second differential amplifier, 10—sample, M1—first metal strip, M2—second metal strip, 10-1—insulating thin film, 10-2—substrate, 10-3—insulating layer, and 10-4—conductive thin film.

DETAILED DESCRIPTION

The present disclosure is further described below in conjunction with specific embodiments and drawings.

Figure 1:
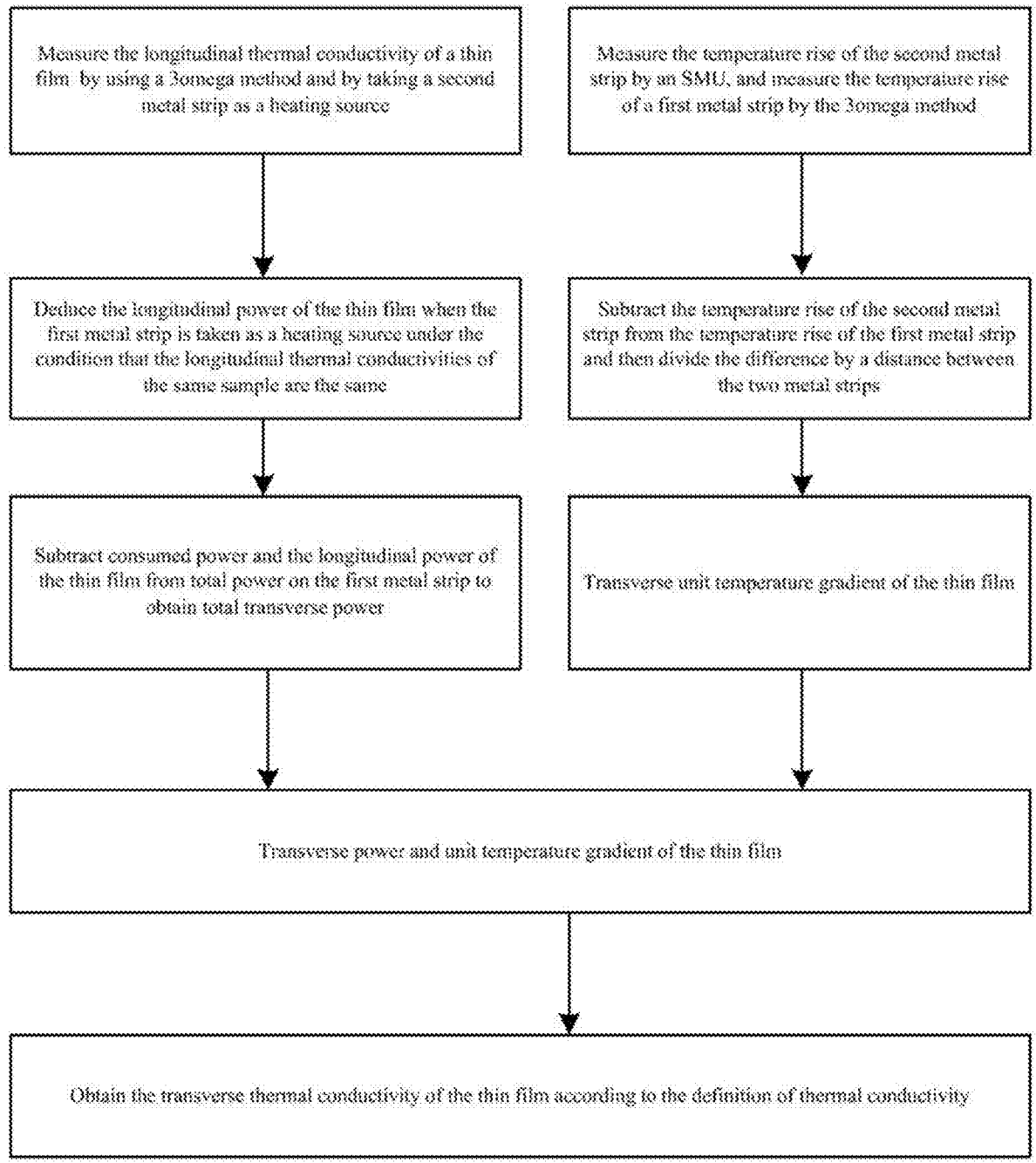
FIG. 1 is a flow diagram of a method according to one embodiment of the present disclosure.
Figure 8:
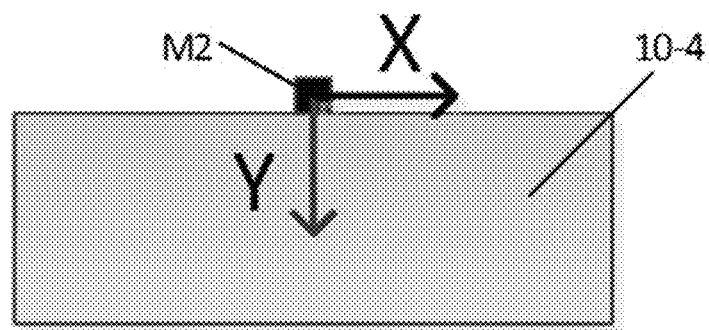
FIG. 8 is a transverse and longitudinal heat transfer directional diagram of a sample according to one embodiment of the present disclosure.

The present disclosure provides a method for measuring the transverse thermal conductivity of a thin film, which is shown in FIG. 1 and comprises the following steps:

S1, the longitudinal thermal conductivity $K_Y$ of a thin film to be measured is measured by using a 3ω method and by taking a second metal strip as a heating source; the second metal strip is deposited on the surface of the thin film to be measured, a substrate is arranged on the bottom of the thin film to be measured, a sample is formed by the thin film to be measured and the substrate, and the sample is arranged in a non-suspension mode; and the longitudinal direction is a direction perpendicular to the thin film to be measured, as shown in FIG. 8.

Figure 2:
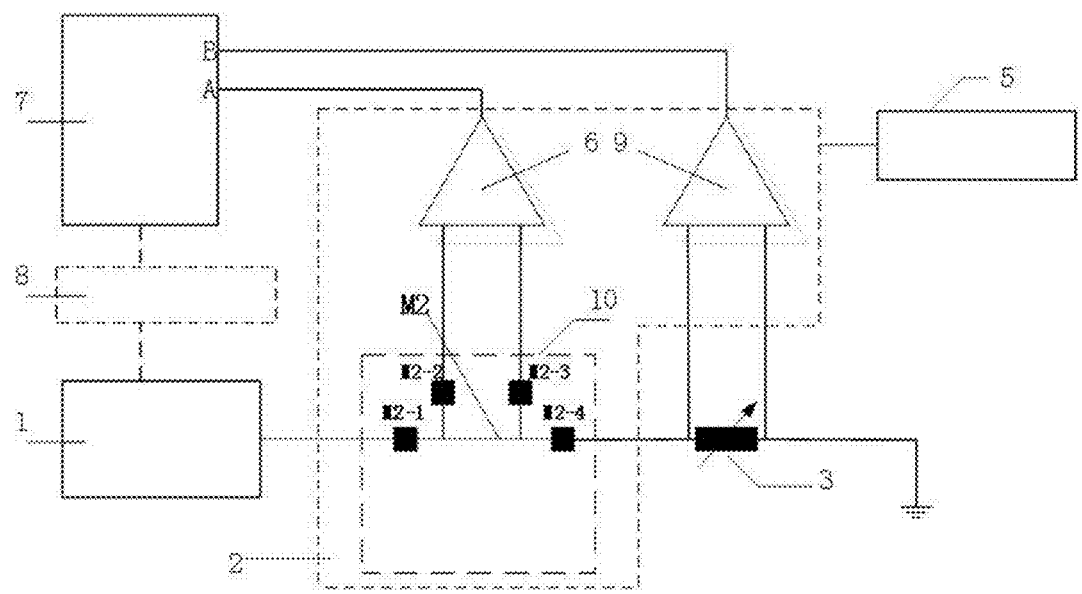
FIG. 2 is a schematic circuit diagram of measuring the longitudinal thermal conductivity of a thin film to be measured in accordance with one embodiment of the present disclosure.

In the embodiment, the thin film to be measured is a silicon dioxide thin film. Components of a device are connected according to FIG. 2, the second metal strip M2 with the line width of 40 μm is sequentially provided with four pins M2-1, M2-2, M2-3 and M2-4 in the length direction, an alternating current source 1 is connected with M2-1, M2-4 is grounded through an adjustable resistor 3, input ends of a first differential amplifier 6 are connected with M2-2 and M2-3, input ends of a second differential amplifier 9 are connected with two ends of the adjustable resistor 3, the output end of the first differential amplifier 6 and the output end of the second differential amplifier 9 are respectively connected with an end A and an end B of the phase-locked amplifier 7, and the output end of the phase-locked amplifier 7 is connected with a data processing controller (which is a computer 8 in the embodiment). The second metal strip M2, the first differential amplifier 6, the second differential amplifier 9 and the adjustable resistor 3 form a bridge, the direct-current regulated power supply 5 provides driving voltages for the first differential amplifier 6 and the second differential amplifier 9, the alternating-current source 1 provides exciting current for the bridge, and the phase-locked amplifier 7 measures third-harmonic generation voltages at the two ends of M2-2 and M2-3.

Figure 10:
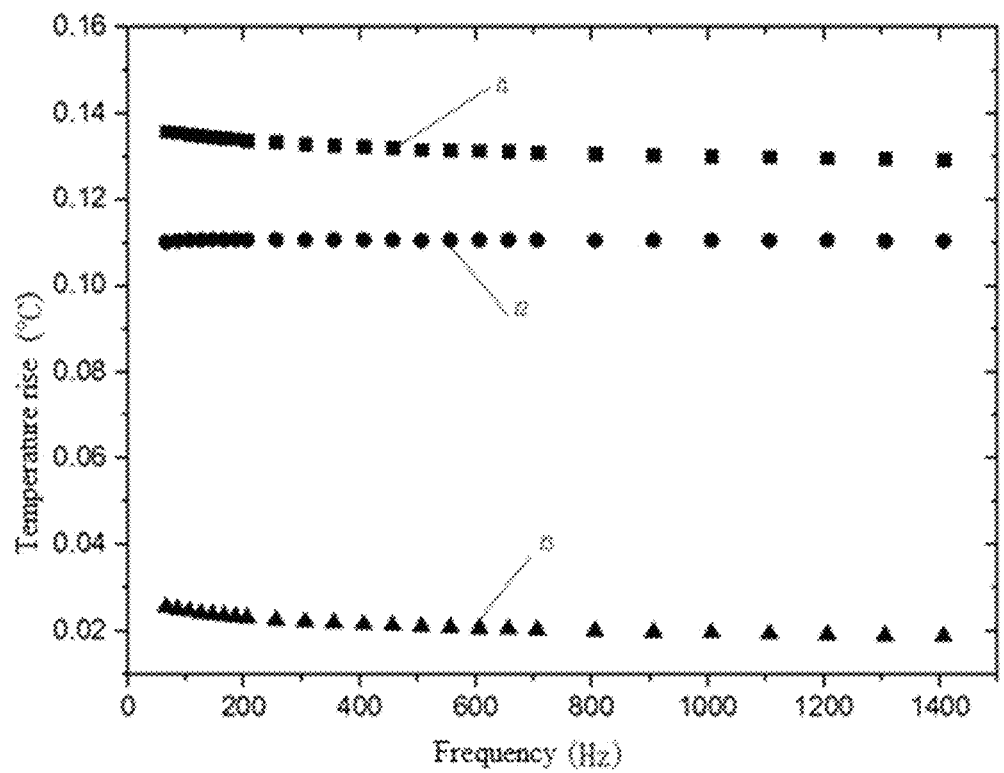
FIG. 10 is a curve graph showing the temperature rise of the second metal strip, the thin film to be measured and the substrate under different frequencies during measuring of the longitudinal thermal conductivity of the thin film to be measured in one embodiment of the present disclosure.

All power supplies are switched on to provide an excitation current value 0.5 mA, then the balance of the bridge is adjusted, software for testing the longitudinal thermal conductivity of the thin film is started, alternating current $I_0 \cos(\omega t)$ is applied to two pins M2-1 and M2-4 at two ends of the second metal strip M2, $I_0$ is the amplitude of the alternating current, the parameter is selected according to the resistance value of the second metal strip, the voltage of the current coupled with the resistance does not exceed the amplitude 1V of the phase-locked amplifier, ω is the angular frequency of the alternating current, ω=2πf, f is the frequency and can be 5 KHz or below in a low frequency band, third-harmonic generation voltages $V_{3\omega}$ at two ends M2-2 and M2-3 in the middle of the second metal strip M2 under different frequencies are measured through the phase-locked amplifier, the temperature rise $$\Delta T_{M2} = \frac{2V_{3\omega M2}}{\alpha V_{M2}}$$

of the second metal strip M2 and the temperature rise $$\Delta T_{SM2} = \frac{P'}{\pi L K_S}\left[\frac{1}{2}\ln\frac{K_S}{\rho C(b_2/2)^2} + \eta - \frac{1}{2}\ln\omega\right]$$

of the substrate under different frequencies are obtained through software processing, then, the temperature rise $\Delta T_f = \Delta T_{M2} - \Delta T_{SM2}$ of the thin film to be measured is calculated, as shown in FIG. 10, in FIG. 10, 11 is a temperature rise curve of the metal strips, 12 is a temperature rise curve of the thin film to be measured, and 13 is a temperature rise curve of the substrate; the longitudinal thermal conductivity $$K_Y = \frac{P'd}{S_Y \Delta T_f}$$

of the thin film can be obtained by the definition of thermal conductivity, wherein P' is the total power on the second metal strip M2, d is the thickness of the thin film to be measured in the longitudinal direction, $S_Y$ is the cross sectional area of the thin film to be measured in the longitudinal direction, $\Delta T_f$ is the temperature rise of the thin film to be measured in the longitudinal direction, $\alpha$ is the resistance temperature coefficient of the second metal strip M2 and $$\alpha = \frac{1}{R}\frac{dR}{dT},$$

Figure 11:
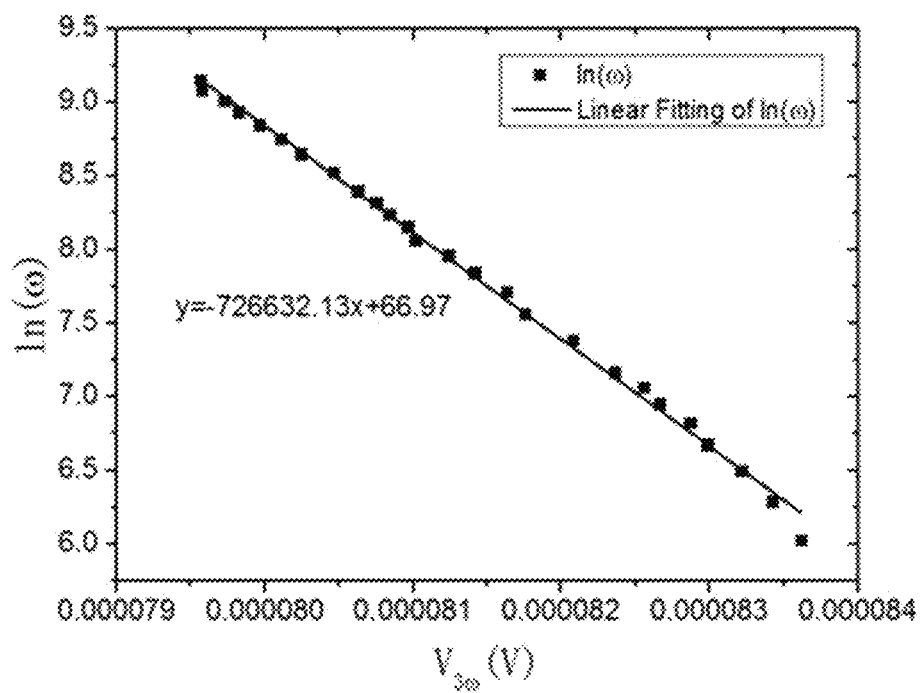
FIG. 11 is a graph of slope required during measuring of the thermal conductivity of the substrate in accordance with one embodiment of the present disclosure.

$V_{M2}$ and $V_{3\omega M2}$ are first-harmonic generation voltage and third-harmonic generation voltage at two ends of two pins 2-2 and 2-3 in the middle of the second metal strip M2, $K_S$ is the thermal conductivity of the substrate and $$K_S = -\frac{V^3\alpha}{4\pi lR}\frac{dln\omega}{dV_{3\omega M2}}, \frac{dln\omega}{dV_{3\omega M2}}$$

can be processed with third-harmonic generation voltage data under different frequencies, as shown in FIG. 11, ρ, C are the density 2340 Kg/m³ and specific heat 713 J/(Kg*K) of the silicon substrate, respectively, $b_2$ is the line width of the second metal strip M2, η is constant 0.923, at the moment, the longitudinal thermal conductivity of the silicon dioxide thin film is measured to be 1.4 W/(m*K), and the thermal conductivity of the silicon substrate is measured to be 149.29 W/(m*K), the experimental results conform to the literature values of the thermal conductivity of silicon dioxide and silicon, and the method for measuring the longitudinal thermal conductivity of a thin films has been mature, and is not emphatically introduced here.

Figure 9:
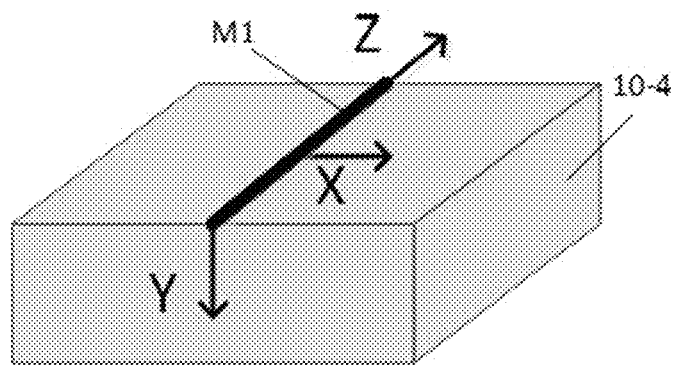
FIG. 9 is a heat transfer directional diagram in the length direction in the metal strips according to one embodiment of the present disclosure.

S2, the temperature rise of the thin film to be measured in the longitudinal direction is measured by using the 3ω method and by taking a first metal strip as a heating source, and the thermal power $P_Y$ of the thin film to be measured in the longitudinal direction is deduced in combination with the measured longitudinal thermal conductivity $K_Y$; meanwhile, the temperature rise $\Delta T_1$ of the first metal strip and the temperature rise $\Delta T_2$ of the second metal strip caused by a thermal field generated by the temperature rise of the first metal strip in the transverse direction of the thin film to be measured are measured; the total power P of the first metal strip is calculated through the current and the resistance of the first metal strip; the thermal power $P_1$ consumed by the first metal strip due to resistance change is calculated through the change amounts of the current and the resistance of the first metal strip; the first metal strip is deposited on the surface of the sample, the first metal strip and the second metal strip are parallel to each other, the distance is D, the lengths L are equal, the line width of the second metal strip is larger than that of the first metal strip; and the transverse direction is a direction in which the surface of the thin film to be measured is perpendicular to the length direction of the first metal strip, as shown in FIG. 9, the X direction is the transverse direction, the Y direction is the longitudinal direction, and the Z direction is the length direction of the first metal strip M1.

Figure 3:
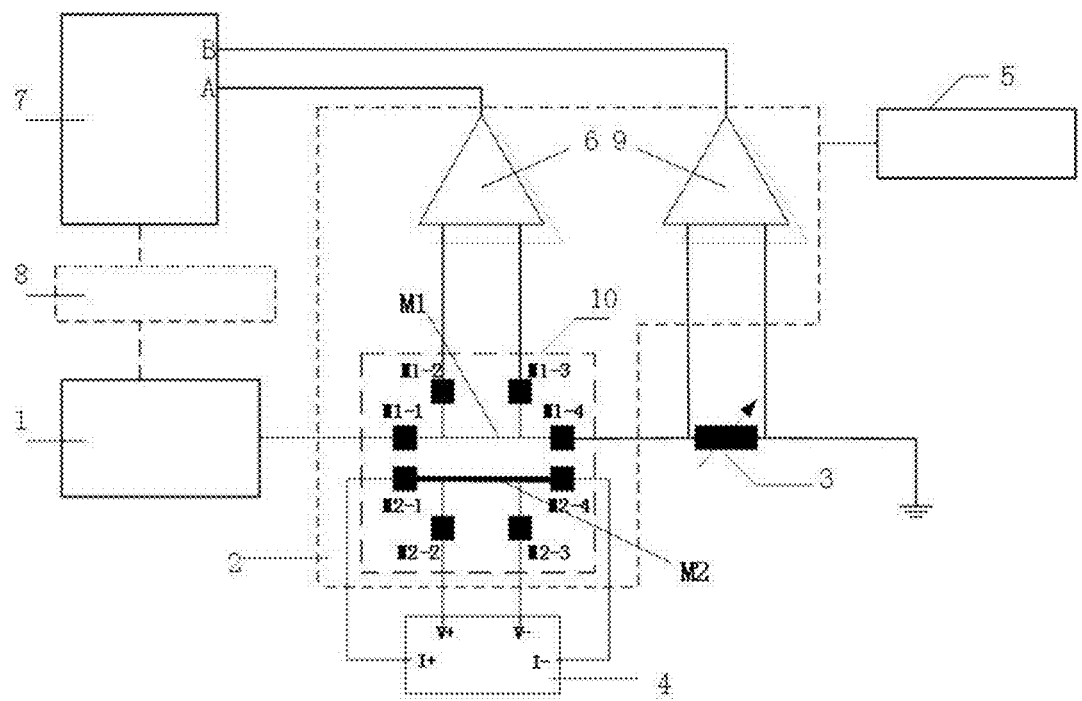
FIG. 3 is a schematic circuit diagram of matched measurement of two metal strips of a device in accordance with one embodiment of the present disclosure.

In the embodiment, components of a device are connected according to FIG. 3, the first metal strip M1 with the line width of 8 μm is provided with four pins M1-1, M1-2, M1-3 and M1-4 in sequence in the length direction, the alternating current source 1 is connected with M1-1, M1-4 is grounded through the adjustable resistor 3, the input ends of the first differential amplifier 6 are connected with M1-2 and M1-3, the input ends of the second differential amplifier 9 are connected to two ends of the adjustable resistor 3, the output end of the first differential amplifier 6 and the output end of the second differential amplifier 9 are respectively connected to the end A and the end B of the phase-locked amplifier 7, and the output end of the phase-locked amplifier 7 is connected to the data processing controller (which is the computer 8 in the embodiment). The first metal strip M2, the first differential amplifier 6, the second differential amplifier 9 and the adjustable resistor 3 form a bridge, the direct-current regulated power supply 5 provides driving voltages for the first differential amplifier 6 and the second differential amplifier 9, the alternating-current source 1 provides exciting current for the bridge, and the phase-locked amplifier 7 measures third-harmonic generation voltages at the two ends of M1-2 and M1-3. The computer 8 is connected with the alternating current source 1 and the phase-locked amplifier 7 so as to control the alternating current source 1 and the phase-locked amplifier 7. The SMU 4 is provided with four leads $I_+$, $V_+$, $V_-$ and $I_-$ which are respectively connected with the pins M2-1, M2-2, M2-3 and M2-4 of the second metal strip M2, current is applied to the second metal strip M2, and the resistance of the two ends of the SMU 4 can be obtained by measuring the voltage between the middle two pins M2-2 and M2-3.

2.1, the first metal strip M1 with the line width of 8 μm is taken as a heating source, and the thermal power of the total thermal power P in the first metal strip M1 in the longitudinal direction and the transverse direction is calculated by using the longitudinal thermal conductivity of the thin film to be measured.

(1) The Y direction is the longitudinal direction, and $$P_Y = \frac{K_Y S_Y \Delta T_Y}{d_Y}$$

is deduced by using the definition of thermal conductivity, wherein $P_Y$ is the thermal power in the longitudinal direction, $K_Y$ is the longitudinal thermal conductivity of the thin film, $S_Y$ is the cross-sectional area during longitudinal heat transfer, $\Delta T_Y$ is the temperature rise of the thin film in the longitudinal direction, and $d_Y$ is the thickness of the thin film in the longitudinal direction. $K_Y$, $S_Y$ and $d_Y$ are constants, and $P_Y$ can be calculated by measuring $\Delta T_Y$;

(2) The alternating current source 1 provides a current 0.5 mA and then adjusts the bridge balance, the software portion for testing the transverse thermal conductivity of the thin film is started, at the moment, the whole circuit begins to run, alternating current $I_0 \cos(\omega t)$ is applied to two pins M1-1 and M1-4 at two ends of the first metal strip M1, the third-harmonic generation voltages $V_{3\omega}$ at two ends of the middle two pins M1-1 and M1-4 of the first metal strip M1 under different frequencies are measured to obtain the temperature rise $$\Delta T_{M2} = \frac{2V_{3\omega M2}}{\alpha V_{M2}}$$

on the first metal strip and the temperature rise $$\Delta T_{M1} = \frac{P_Y}{\pi L K_S}\left[\frac{1}{2}\ln\frac{K_S}{\rho C(b_1/2)^2} + \eta - \frac{1}{2}\ln\omega\right]$$

of the substrate under different frequencies, then, the temperature rise of the thin film to be measured in the longitudinal direction is $\Delta T_Y = \Delta T_{M1} - \Delta T_{S_{M1}}$, and the temperature rise $\Delta T_Y$ of the thin film to be measured in the longitudinal direction is substituted into $$P_Y = \frac{K_Y S_Y \Delta T_Y}{d_Y},$$

wherein $K_Y$ is 1.4 W/(m*K), $S_Y$ and $d_Y$ are also constants, and $P_Y$ can be determined to be 7.147 mW.

(3) The total power $$P = \frac{I_0^2 R}{2}$$

on the first metal strip M1 is equal to 7.566 mW, the power consumed by the first metal strip M1 is $$P_1 = \frac{I_0^2 \Delta R}{2} \approx 0$$

due to resistance change, $\Delta R$ is the difference between the resistance corresponding to the proper current selected when the transverse thermal conductivity of the thin film to be measured is normally tested and the resistance corresponding to the microampere current used when the bridge balance is adjusted, at the moment, the resistance change value can also be measured for multiple times to obtain an average value, and then the total thermal power conducted from the first metal strip M1 to the thin film to be measured is $P-P_1$; and the power $P_X = P - P_1 - P_Y$ in the transverse direction of the thin film to be measured can be obtained by subtracting the power $P_Y$ in the longitudinal direction of the thin film to be measured from the total thermal power in the thin film to be measured, and due to symmetric heat conduction on two sides of the metal strips in the transverse direction, the thermal power conducted on one side of the first metal strip M1 is $$\frac{P_X}{2} = 0.21 \text{ mW}.$$

2.2, the temperature rise on the second metal strip M2 caused by the temperature rise of the first metal strip M1 is measured to obtain the temperature difference $\Delta T_X$ between the two metal strips.

Figure 12:
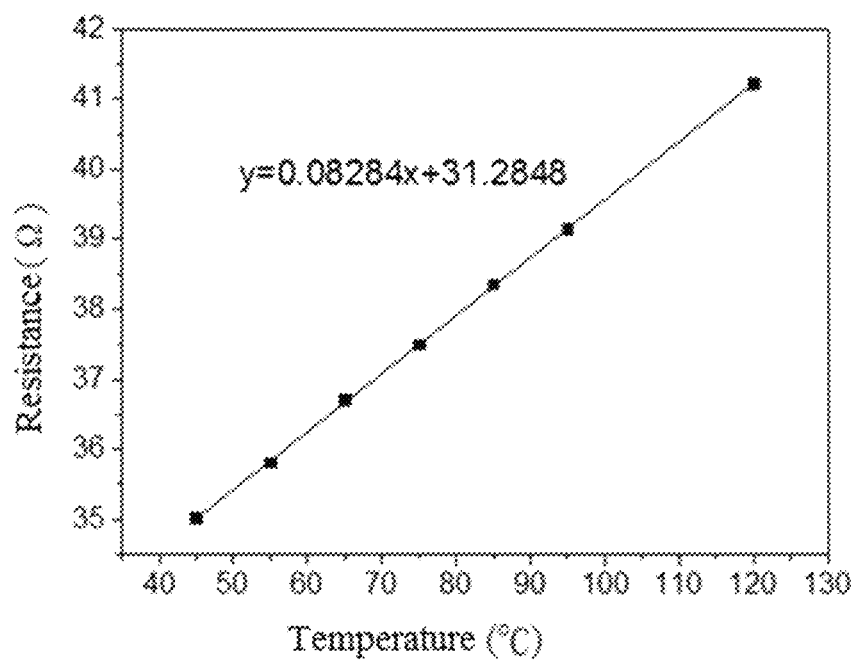
FIG. 12 is a relational graph of resistance and temperature coefficient of the metal strips.

At the moment, the second metal strip M2 is used as a temperature detector to detect the temperature rise at the position which is distant from the first metal strip M1 by a length D, and then the difference of subtracting the temperature rise detected by the second metal strip M2 from the temperature rise on the first metal strip M1 is the temperature difference of the thin film to be measured with the length of D in the transverse direction. The temperature rise on the first metal strip M1 is $$\Delta T_1 = \Delta T_{M1} = \frac{2V_{3\omega M1}}{\beta V_{M1}} \approx 0.2219° \text{ C.},$$

the temperature rise on the first metal strip M1 causes the temperature rise $$\Delta T_2 = \frac{\Delta R}{\alpha R}$$

on the second metal strip M2, wherein α and β are respectively the temperature coefficients of resistance of the second metal strip M2 and the first metal strip M1 and can be obtained by measuring the change situation of the resistance values of the second metal strip M2 and the first metal strip M1 at different temperatures, as shown in FIG. 12, the materials of the two metal strips in the embodiment are the same, and the temperature coefficient of resistance of the metal strips at room temperature is 0.00245. When the temperature rise on the second metal strip M2 is measured, a four-wire method in the SMU is required, tiny current is applied to two ends of the second metal strip M2 through two wires, two wires are led out from two pins M2-2 and M2-3 in the middle of the second metal strip M2 to measure the voltages at two ends of the second metal strip M2, then the resistance between the two pins M2-2 and M2-3 in the middle of the second metal strip M2 can be obtained, the resistance of the second metal strip M2 is then measured again when a temperature rise exists on the first metal strip M1, thus, the difference between the resistance measured twice is the change value of the resistance of the second metal strip M2, measurement is performed in this way for 10 or more sets, the average value $\Delta R$ of the resistance value and the change value of the resistance of the second metal strip M2 is obtained, the resistance value and the change value of the resistance are substituted into $$\Delta T_2 = \frac{\Delta R}{\alpha R}$$

so as to obtain the temperature rise $\Delta T_2 = 0.1194°$ C. on the second metal strip M2. The temperature difference between the two metal strips is $\Delta T_X = \Delta T_1 - \Delta T_2 \approx 0.1025°$ C.

S3, the transverse thermal conductivity $K_X$ of the thin film to be measured with the thickness of d is calculated according to the following formula:

$$K_X = \frac{(P - P_1 - P_Y)D}{2Ld(\Delta T_1 - \Delta T_2)}.$$

In the embodiment, parameters such as the thermal power 0.21 mW in the transverse direction of the thin film to be measured on one side of the first metal strip, the distance 5 μm between the two metal strips, the temperature difference $\Delta T_X = \Delta T_1 - \Delta T_2 \approx 0.1025°$ C. between the two metal strips and the cross-sectional area $3.2 \times 10^{-9}$ m² in the transverse direction of the thin film to be measured are substituted into the definition $$K_X = \frac{P_X D}{2 S_X \Delta T_X}$$

of the transverse thermal conductivity of the thin film to be measured, so that the transverse thermal conductivity of the silicon dioxide thin film is 1.6 W/(m*K), although the transverse thermal conductivity of the silicon dioxide thin film is slightly larger than the longitudinal thermal conductivity which is 1.4 W/(m*K), the transverse thermal conductivity of the silicon dioxide thin film is still within the classical value range of silicon dioxide, and it shows that the test method is accurate and feasible.

The working principle of the present disclosure is as follows: in order to accurately measure the transverse thermal conductivity of a micro-nano film material, the thermal power in the transverse direction and the unit temperature gradient of the thin film to be measured must be accurately measured according to the definition, the thermal power in the transverse direction can be obtained by energy conservation analysis, and the unit temperature gradient can be obtained by dividing the measured temperature difference between the two metal strips by the distance between the two metal strips. The distribution condition of the total heat generated in the heating source according to an energy conservation theorem is as follows:

(1) The first metal strip M1 is taken as a research object, and total heat generated by current heating is divided into heat radiated from the surfaces of the metal strips to a surrounding environment, heat consumed by the metal strips due to resistance change and heat conducted from the bottoms of the metal strips to the thin film to be measured. The radiated heat can be ignored by providing a vacuum environment, and since the size of the metal strips is an order of magnitude of $10^{-15}$, according to a definition formula $Q=C\rho V\Delta T$ of the heat, the heat consumed due to temperature rise is infinitely close to zero and can also be ignored.

(2) The thin film to be measured is taken as a research object, the heat flowing into the thin film to be measured from the bottoms of the metal strips is divided into heat conducted in the longitudinal direction (Y) and the transverse direction (X) and heat radiated to air from the surface of the thin film to be measured; and because the thin film portion to be measured between the two metal strips is studied, and the distance between the two metal strips is of micron order, the heat radiated by the thin film to be measured can also be ignored. The total heat conducted from the metal strips into the thin film to be measured is then divided into heat in the longitudinal and transverse directions, and the total thermal power in the thin film is divided into thermal power in the longitudinal and transverse directions due to the consistency of time. Therefore, the thermal power in the transverse direction can be obtained only by determining the thermal power in the longitudinal direction; and the total thermal power conducted from the metal strips to the thin film to be measured is obtained by subtracting the thermal power consumed by resistance change of the metal strips from the total thermal power generated by Joule heat on the metal strips.

Figure 4:
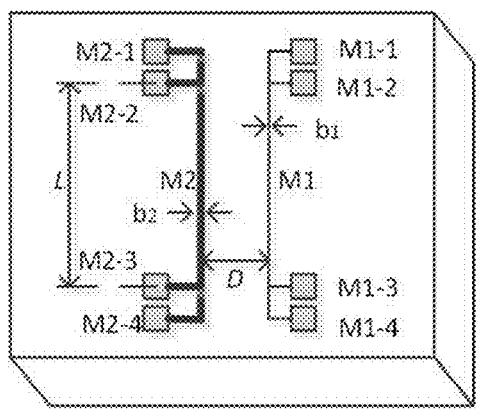
FIG. 4 is a top-view structure diagram of a sample according to one embodiment of the present disclosure.

FIG. 4 is a top-view structure diagram of a sample according to one embodiment of the present disclosure, two metal strips are deposited on the surface of the sample 10, the lengths of the two metal strips are L, the distance between the two metal strips is D, and the widths of the two metal strips are $b_1$, $b_2$ respectively; four pins of the first metal strip M1 are M1-1, M1-2, M1-3 and M1-4 respectively, and four pins of the second metal strip M2 are M2-1, M2-2, M2-3 and M2-4 respectively; and when the transverse thermal conductivity of the thin film to be measured exists, the first metal strip M1 not only is a heating source, but also is a temperature detector, and the second metal strip M2 is a temperature detector and is used for measuring the temperature rise at the position of the second metal strip M2.

Figure 5:
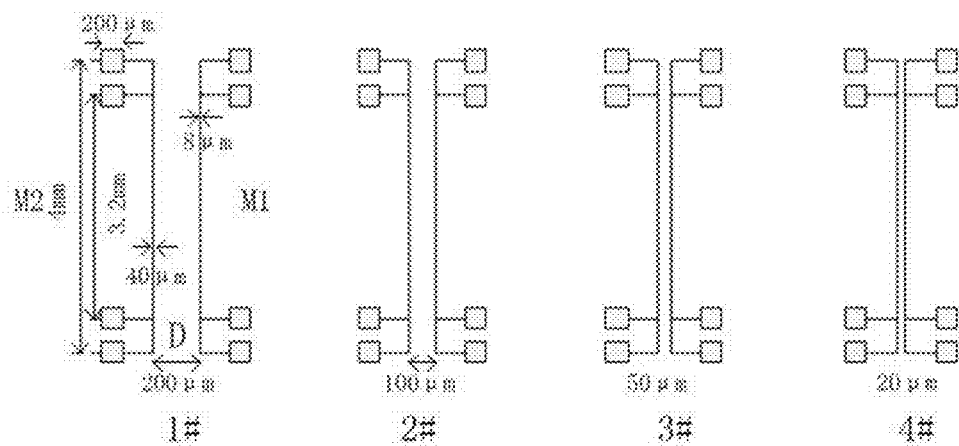
FIG. 5 is a set of mask layouts according to one embodiment of the present disclosure.

The line width $b_1$ of the first metal strip is in the range of 2-15 μm, and the line width $b_2$ of the second metal strip is in the range of 30-100 μm. FIG. 5 is a set of mask layouts according to one embodiment of the present disclosure, different parameters are selected for the lengths and widths of the metal strips according to practical requirements, in the figure, the lengths are 3.2 mm, the widths are 8 μm and 40 μm, respectively, but the distance between the two metal strips is different. The distance D between two metal strips on the surface of the sample is affected by the thickness of the thin film to be measured, the lengths of the metal strips and the transverse thermal conductivity of the thin film to be measured, in the method, four mask patterns with different distances D are selected to meet different sample requirements, wherein the widths of the first metal strip M1 and the second metal strip M2 are 8 μm and 40 μm, respectively, the parameters are a set of parameters chosen to measure the transverse thermal conductivity of the thin film to be measured, the line widths of the two metal strips can be changed according to practical requirements, in principle, the smaller the width of the first metal strip M1, the better, for example, if the line width of the first metal strip M1 is as low as 2 μm, then the thin film to be measured mainly transfers heat in the transverse direction, the larger the width of the second metal strip, the better, for example, the line width of the second metal strip M2 is as high as 100 μm, then the thin film to be measured mainly transfers heat in the longitudinal direction, heat transfer of the thin film to be measured can be ignored, however, considering process issues, a set of data 8 μm and 40 μm are chosen for the experiment. The transverse thermal conductivity of a sample to be measured needs to be considered when the sample is prepared so as to determine the distance D between the two metal strips, and samples with different sizes of the distance D can be prepared when the size of D is uncertain, as shown in FIG. 5, the distances between the two metal strips are 200 μm, 100 μm, 50 μm and 20 μm, respectively, and samples of different distances can be prepared to facilitate the measurement of the transverse thermal conductivity of the thin film. Furthermore, since the thermal conductivity of the silicon dioxide thin film is in the range of 1.07-1.68 W/(m*K), the distance between the two metal strips on the sample should be smaller, thus a batch of samples with the distance of 5 μm between every two metal strips are prepared, the lengths of the two metal strips are 3.2 mm, and line widths are 8 μm and 40 μm, respectively.

The difference of the transverse thermal conductivity of the thin film to be measured corresponds to distances D, in different sizes, between the metal strips, so that the second metal strip M2 can generate temperature change due to the first metal strip M1 taken as the heat source, and the distance D between the metal strips is directly proportional to the transverse thermal conductivity of the thin film to be measured. For a sample with the lengths of the metal strips being 3.2 mm and the thickness of the thin film to be measured being 1 μm, the transverse thermal power of the thin film in an actual testing process is of an order of magnitude of $10^{-3}$~$10^{-4}$ W, the transverse temperature difference of the thin film is of an order of magnitude of $10^{-1°}$ C., and the following can be known according to the definition of thermal conductivity: D≈$K_X$*(3.2 μm~32 μm); if the transverse thermal conductivity of the thin film to be measured is 10 W/(m*K), then the distance between the metal strips in the sample is in the range of 3.2 μm-32 μm; if the transverse thermal conductivity of the thin film to be measured is 100 W/(m*K), then the distance between the metal strips in the sample is in the range of 32-320 μm; similarly, if the transverse thermal conductivity of the thin film to be measured is 500 W/(m*K), the distance between the metal strips in the sample is in the range of 160-1600 μm; and specifically, the distance between the two metal strips should be selected according to the transverse thermal conductivity of the thin film to be measured, the lengths of the metal strips and the thickness of the thin film to be measured.

Figure 6:
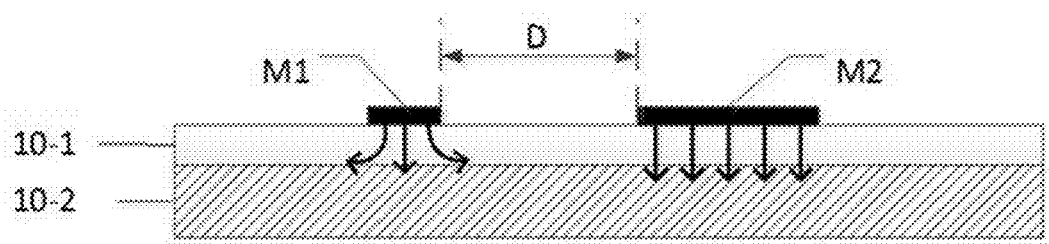
FIG. 6 is a cross-sectional view of a sample according to one embodiment of the present disclosure.
Figure 7:
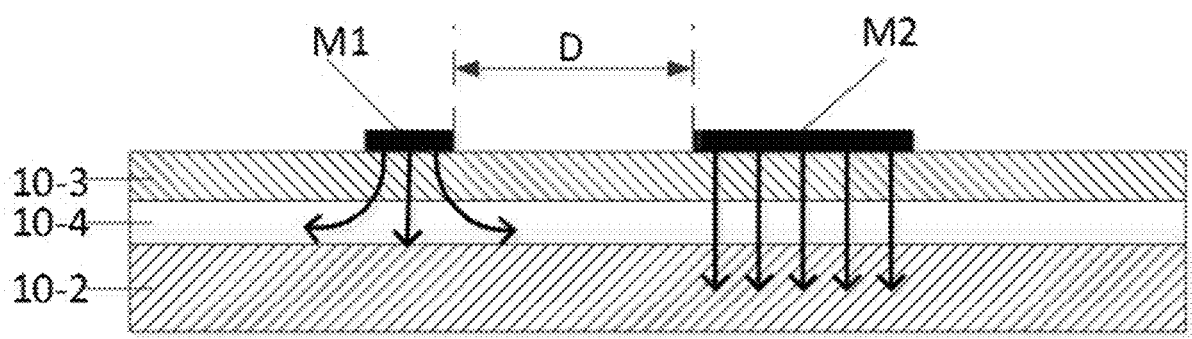
FIG. 7 is a cross-sectional view of a sample in yet another embodiment of the present disclosure.

The materials of the first metal strip and the second metal strip can be the same, can also be different, and are selected from Ag, Au or Pt. FIG. 6 and FIG. 7 are cross-sectional views of samples required during measuring of the transverse thermal conductivity of the thin film. If the thin film to be measured is an insulating thin film 10-1, the insulating thin film 10-1 is made on a substrate 10-2 by magnetron sputtering, then photoetching is carried out on the front surface of the insulating thin film 10-1 by using photoresist to form two metal strip patterns with the same length and different widths, the distance between the two metal strip patterns is D, a connecting layer Ti film and a Pt or Ag film are plated on the front surface of the insulating thin film 10-1 by magnetron sputtering, and then the photoresist is stripped to form the first metal strip M1 and the second metal strip M2. If the thin film to be measured is a conductive thin film 10-4, the conductive thin film 10-4 is made on the substrate 10-2 by magnetron sputtering, an insulating layer 10-3 is plated on the surface of the conductive thin film 10-4, photoresist is used for photoetching to form two metal strip patterns with the same length and different widths, the distance between the two metal strip patterns is D, a connecting layer Ti film and a Pt or Ag film are plated on the surface by magnetron sputtering, and the photoresist is then stripped to form the first metal strip M1 and the second metal strip M2.

Preferably, the conductive thin film is a low-thermal-conductivity thin film to be measured with nanoscale thickness, the insulating thin film is a known high-thermal-conductivity insulating thin film, and the order of magnitude of the total thickness of the thin film to be measured is tens of micrometers. After the transverse thermal conductivity $K_X$ of the thin film to be measured with the thickness of d is obtained, the transverse thermal conductivity of the low-thermal-conductivity thin film to be measured with the nanoscale thickness is calculated according to the following formula:

$$\lambda_{total}d_{total}=\lambda_1 d_1+\lambda_2 d_2.$$

In the formula, $\lambda_{total}$, $\lambda_1$ and $\lambda_2$ are the thermal conductivities of the thin film to be measured, the conductive thin film and the insulating thin film respectively; and $d_{total}$, $d_1$ and $d_2$ are thicknesses of the thin film to be measured, the conductive thin film and the insulating thin film respectively.

The distance D between the two metal strips on the surface of the sample is affected by the thickness of the thin film to be measured, the lengths of the metal strips and the transverse thermal conductivity of the thin film to be measured, when the size of the metal strips is determined, the distance between the two metal strips can be increased for the nanoscale low-thermal-conductivity thin film to be measured by superposing the nanoscale thin film to be measured and a high-thermal-conductivity insulating thin film as a total thin film layer to be measured, the distance can reach up to tens of microns or more in order to reduce process difficulties, then the transverse thermal conductivity of the thin film to be measured is obtained through $\lambda_{total}d_{total}=\lambda_1 d_1+\lambda_2 d_2$, wherein $\lambda_{total}$, $\lambda_1$ and $\lambda_2$ are the thermal conductivities of the total thin film to be measured, the thin film to be measured and the insulating thin film respectively; and $d_{total}$, $d_1$ and $d_2$ are the thicknesses of the total thin film to be measured, the thin film to be measured and the insulating thin film respectively. Therefore, the method for measuring the transverse thermal conductivity of the thin film is not limited by the transverse thermal conductivity of the thin film to be measured, can be generally applied to measurement of the transverse thermal conductivity of various thin films, and can reduce the error to the measurement result caused by the insulating layer as much as possible by the thickness of the thin film to be measured relative to the thickness of the insulating layer.

The method can be used for measuring the transverse thermal conductivity of the micro-nano thin film, the thickness of the thin film to be measured is specifically in the range of 0.5 nm-50 μm, the thickness of the thin film to be measured relates to longitudinal heat transfer when the longitudinal thermal conductivity is measured and transverse heat transfer when the transverse thermal conductivity is measured, and if the thickness of the thin film to be measured is too large, the heat transferred to the thin film to be measured from the metal strips can only be conducted in a certain depth in the thin film to be measured, therefore, when the transverse thermal conductivity is calculated, the used transverse sectional area cannot be calculated by the actual thickness of the thin film to be measured, otherwise the error is large; and similarly, if the thickness of the thin film to be measured is too small and the heat on the metal strips is transferred into the substrate, at the moment, heat transfer may not exist in the transverse direction, then the transverse thermal conductivity cannot be measured, in order to be able to measure the transverse thermal conductivity of the thin film with quite low thickness, as mentioned above, the thin film to be measured and the insulating thin film can be superposed as a total thin film, then the transverse thermal conductivity of the total thin film is measured at first, then the transverse thermal conductivity of the thin film to be measured and the transverse thermal conductivity of the insulating layer are calculated respectively, and therefore, the extremely low transverse thermal conductivity of the film can be measured theoretically; and thus, the theoretical estimated thickness of the thin film to be measured is in the range of 0.5 nm-50 μm.

The thin film to be measured is a two-dimensional material such as graphene, black phosphorus, BN and $MoS_2$. The thin film to be measured is a conductive thin film or a non-conductive thin film; and when the thin film to be measured is the conductive thin film, a layer of insulating thin film such as $SiO_2$, $Si_3N_4$ or SiC covers the thin film to be measured. When the thermal conductivity of the thin film to be measured is in the range of 0-1 W/(m*K), a SiC thin film is taken as an insulating thin film; when the thermal conductivity of the thin film to be measured is in the range of 1-10 W/(m*K), a $SiO_2$ thin film is taken as an insulating thin film; and when the thermal conductivity of the thin film to be measured is 10 W/(m*K) or above, a $SiO_2$ or $Si_3N_4$ thin film is used as an insulating thin film.

A sample substrate can be a substrate with low thermal conductivity, such as quartz glass, so that heat transfer of the thin film in the transverse direction is main heat transfer, but at the moment, the glass substrate is not easy to cut in the process, the thickness is large, the area is also large, and it is difficult to place the glass substrate in a tube shell; and a high-thermal-conductivity substrate, such as a silicon substrate, is also theoretically feasible, except that the heat transfer distance in the transverse direction of the thin film is limited because part of heat may be transferred into the substrate at the moment. In the method, both longitudinal and transverse thermal conductivity measurements are taken, the thermal conductivity measurement in the two directions have different requirements on the substrate, for example, during longitudinal thermal conductivity measurement, the thermal conductivity of the thin film to be measured is required to be less than the thermal conductivity of the substrate, during transverse thermal conductivity measurement, the thermal conductivity of the thin film to be measured is required to be greater than the thermal conductivity of the substrate, thus substrate selection is somewhat contradictory, but for a certain thin film to be measured, the thermal conductivity is determined, then an equilibrium point can be found according to the estimated range of the thermal conductivity of the thin film to be measured as a basis for selecting the thermal conductivity of the substrate, and thus, even if errors still exist, the errors can also be reduced as much as possible.

According to the method, the present disclosure also provides a device for measuring the transverse thermal conductivity of the thin film, comprising:

a first metal strip and a second metal strip which are deposited on the surface of the thin film to be measured, wherein the first metal strip and the second metal strip are parallel to each other, the distance is D, the lengths L are equal, and the line width of the second metal strip is larger than that of the first metal strip; pins for measurement by a 3ω method are respectively arranged on the first metal strip and the second metal strip; and a substrate is arranged on the bottom of the thin film to be measured, and the thin film to be measured and the substrate form a sample;

an alternating current source, two differential amplifiers, an adjustable resistor, a phase-locked amplifier, a data processing controller, an SMU and a direct current regulated power supply which are used for measurement by the 3ω method, wherein the alternating current source is controlled by the data processing controller; the output end of the alternating current source, the input ends of the first differential amplifier and one end of the adjustable resistor are simultaneously only connected with the pin of the first metal strip or the pin of the second metal strip, and the other end of the adjustable resistor is grounded; the input ends of the second differential amplifier are connected with the two ends of the adjustable resistor in parallel; the output ends of the two differential amplifiers are connected with the input ends of the phase-locked amplifier, and the output end of the phase-locked amplifier is connected with the data processing controller; the SMU is connected with the pin of the second metal strip; and the direct current regulated power supply is used for providing driving voltages for the two differential amplifiers;

a vacuum device which is used for providing a vacuum environment for the thin film to be measured;

the data processing controller is used for calculating the transverse thermal conductivity $K_X$ of the thin film to be measured with the thickness of d according to the following formula:

$$K_X = \frac{(P - P_1 - P_Y)D}{2Ld(\Delta T_1 - \Delta T_2)}.$$

In the formula, P is the total power of the first metal strip; $P_1$ is the thermal power consumed by the first metal strip due to resistance change; $K_Y$ is the longitudinal thermal conductivity of the thin film to be measured, and is measured by taking the second metal strip as a heating source by the 3ω method; $\Delta T_1$ is the temperature rise of the first metal strip, $\Delta T_2$ is the temperature rise of the second metal strip caused by the thermal field generated by the temperature rise of the first metal strip in the transverse direction of the thin film to be measured, and is measured by taking the first metal strip as a heating source by the 3ω method; the longitudinal direction is a direction perpendicular to the thin film to be measured, and the transverse direction is a direction in which the surface of the thin film to be measured is perpendicular to the length direction of the first metal strip.

Preferably, the sample 10, the first metal strip M1, the second metal strip M2 and the two differential amplifiers are arranged on a PCB 2 arranged in the vacuum device. The first metal strip M1 is sequentially provided with four pins M1-1, M1-2, M1-3 and M1-4 in the length direction; and the second metal strip M2 is sequentially provided with four pins M2-1, M2-2, M2-3 and M2-4 in the length direction.

In the embodiment, the alternating current source 1 is a Keithley 6221 current source, the SMU 4 is a precision source/measure unit, and the phase-locked amplifier 7 is an SR810 phase-locked amplifier.

The method is used for accurately measuring the transverse thermal conductivity of the thin film by using the 3ω method, the measured transverse power is more accurate by quantifying the thermal power in the longitudinal direction and the transverse direction of the thin film, and the temperature measured by using the metal strips as temperature sensors is better in accuracy, so that the accuracy of the measured transverse thermal conductivity is higher.

The foregoing embodiments are merely used for explaining the design ideas and features of the present disclosure in order to enable those skilled in the art to understand contents of the present disclosure and to practice the same, and the scope of protection of the present disclosure is not limited to the foregoing embodiments. Therefore, all equivalent changes or modifications according to the principle and design thought discovered by the present disclosure should fall within the extent of protection of the present disclosure.

What is claimed is:

1. A method for measuring a transverse thermal conductivity of a thin film, comprising the following steps:

S1, measuring a longitudinal thermal conductivity $K_Y$ of a thin film to be measured by using a 3ω method and by taking a second metal strip as a heating source; depositing the second metal strip on a surface of the thin film to be measured, arranging a substrate on a bottom of the thin film to be measured, forming a sample by the thin film to be measured and the substrate, and arranging the sample in a non-suspension mode; and setting a longitudinal direction as a direction perpendicular to the thin film to be measured;

S2, measuring a temperature rise of the thin film to be measured in the longitudinal direction by using the 3ω method and by taking a first metal strip as the heating source, and deducing a thermal power $P_Y$ of the thin film to be measured in the longitudinal direction in combination with the measured longitudinal thermal conductivity $K_Y$; meanwhile, measuring a temperature rise $\Delta T_1$ of the first metal strip, and a temperature rise $\Delta T_2$ of the second metal strip caused by a thermal field generated by the temperature rise of the first metal strip in a transverse direction of the thin film to be measured;

calculating a total power P of the first metal strip through a current and a resistance of the first metal strip; and calculating a thermal power $P_1$ consumed by the first metal strip due to a resistance change through the change amounts of the current and the resistance of the first metal strip;

depositing the first metal strip on a surface of the sample, enabling the first metal strip and the second metal strip to be parallel to each other, a length of the first metal strip and a length of the second metal strip to being equal, and enabling a line width of the second metal strip to be larger than a line width of the first metal strip; and setting the transverse direction to be a direction in which the surface of the thin film to be measured is perpendicular to a length direction of the first metal strip; and S3, calculating the transverse thermal conductivity $K_X$ of the thin film to be measured with a thickness of d according to the following formula:

$$K_X = \frac{(P - P_1 - P_Y)D}{2Ld(\Delta T_1 - \Delta T_2)}$$

wherein D is a distance between the first metal strip and the second metal strip, and L is the length of the first metal strip or the second metal strip.

2. The method for measuring the transverse thermal conductivity of a thin film according to claim 1, wherein the first metal strip and the second metal strip are made of Ag, Au or Pt.

3. The method for measuring the transverse thermal conductivity of a thin film according to claim 1, wherein the line width $b_1$ of the first metal strip is in the range of 2-15 µm, and the line width $b_2$ of the second metal strip is in the range of 30-100 µm.

4. The method for measuring the transverse thermal conductivity of a thin film according to claim 1, wherein the temperature rise $\Delta T_Y$ in the longitudinal direction of the thin film to be measured is obtained by subtracting a temperature rise $\Delta T_S$ of the substrate from the temperature rise $\Delta T_1$ of the first metal strip.

5. The method for measuring the transverse thermal conductivity of a thin film according to claim 1, wherein the distance D is determined according to an estimated value of the transverse thermal conductivity of the thin film to be measured, the length of the metal strips and the thickness of the thin film to be measured; and the estimated value of the transverse thermal conductivity of the thin film to be measured is of an order of magnitude, analyzed according to literature or other data, of the transverse thermal conductivity of the thin film to be measured.

6. The method for measuring the transverse thermal conductivity of a thin film according to claim 5, wherein when the length of the first metal strip is 3.2 mm, and the thickness of the thin film to be measured is 1 µm, then, if the estimated value of the transverse thermal conductivity of the thin film to be measured is 10 W/(m*K), then the distance D is in the range of 3.2 µm-32 µm; if the estimated value of the transverse thermal conductivity of the thin film to be measured is 100 W/(m*K), then the distance D is in the range of 32-320 µm; and if the estimated value of the transverse thermal conductivity of the thin film to be measured is 500 W/(m*K), then the distance D is in the range of 160-1600 µm.

7. The method for measuring the transverse thermal conductivity of a thin film according to claim 1, wherein the thin film to be measured comprises a conductive thin film and a layer of insulating thin film covering the conductive thin film, and the first metal strip and the second metal strip are deposited on the insulating thin film.

8. The method for measuring the transverse thermal conductivity of a thin film according to claim 7, wherein the conductive thin film is a low-thermal-conductivity thin film to be measured with a nanoscale thickness, the insulating thin film is a known high-thermal-conductivity insulating thin film, and an order of magnitude of the total thickness of the thin film to be measured is tens of micrometers.

9. The method for measuring the transverse thermal conductivity of a thin film according to claim 8, wherein after the transverse thermal conductivity $K_X$ of the thin film to be measured with the thickness of d is obtained, the transverse thermal conductivity of the low-thermal-conductivity thin film to be measured with the nanoscale thickness is calculated according to the following formula:

$$\lambda_{total}d_{total} = \lambda_1 d_1 + \lambda_2 d_2$$

in the formula, $\lambda_{total}$, $\lambda_1$ and $\lambda_2$ are the thermal conductivities of the thin film to be measured, the conductive thin film and the insulating thin film respectively; and $d_{total}$, $d_1$ and $d_2$ are respectively the thicknesses of the thin film to be measured, the conductive thin film and the insulating thin film.

10. A device for measuring a transverse thermal conductivity of a thin film, comprising:

a first metal strip and a second metal strip which are deposited on a surface of a thin film to be measured, wherein the first metal strip and the second metal strip are parallel to each other, a length of the first metal strip and a length of the second metal strip being equal, and a line width of the second metal strip is larger than a line width of the first metal strip; pins for measurement by a 3ω method that are respectively arranged on the first metal strip and the second metal strip; a substrate that is arranged on a bottom of the thin film to be measured, and the thin film to be measured and the substrate form a sample;

an alternating current source, two differential amplifiers, an adjustable resistor, a phase-locked amplifier, a data processing controller, a source measurement unit (SMU) and a direct current regulated power supply which are used for measurement by the 3ω method, wherein the alternating current source is controlled by the data processing controller; an output end of the alternating current source, input ends of a first differential amplifier and one end of the adjustable resistor are simultaneously only connected with corresponding pins of the first metal strip or corresponding pins of the second metal strip, and the other end of the adjustable resistor is grounded; input ends of a second differential amplifier are connected with the two ends of the adjustable resistor in parallel; output ends of the two differential amplifiers are connected with input ends of the phase-locked amplifier, and an output end of the phase-locked amplifier is connected with the data processing controller; the SMU is connected with the pins of the second metal strip; and the direct current regulated power supply is used for providing driving voltages for the two differential amplifiers;

a vacuum device which is used for providing a vacuum environment for the thin film to be measured;

wherein the data processing controller is used for calculating the transverse thermal conductivity $K_X$ of the thin film to be measured with a thickness of d according to the following formula:

$$K_X = \frac{(P - P_1 - P_Y)D}{2Ld(\Delta T_1 - \Delta T_2)}$$

in the formula, D is a distance between the first metal strip and the second metal strip; L is the length of the first metal strip or the second metal strip; P is a total power of the first metal strip; $P_1$ is a thermal power consumed by the first metal strip due to resistance change; $P_Y$ is a thermal power of the thin film in a longitudinal direction; $\Delta T_1$ is a temperature rise of the first metal strip, $\Delta T_2$ is a temperature rise of the second metal strip caused by a thermal field generated by the temperature rise of the first metal strip in a transverse direction of the thin film to be measured, and is measured by taking the first metal strip as a heating source by using the 3ω method; the longitudinal direction is a direction perpendicular to the thin film to be measured, and the transverse direction is a direction in which the surface of the thin film to be measured is perpendicular to a length direction of the first metal strip.

11. The device for measuring the transverse thermal conductivity of a thin film according to claim 10, wherein the sample, the first metal strip, the second metal strip and the two differential amplifiers are arranged on a printed circuit board (PCB), and the PCB is placed in the vacuum device.

12. The device for measuring the transverse thermal conductivity of a thin film according to claim 10, wherein the first metal strip is sequentially provided with four pins M1-1, M1-2, M1-3 and M1-4 in the length direction; and the second metal strip is sequentially provided with four pins M2-1, M2-2, M2-3 and M2-4 in the length direction.

* * * * *